United States Patent
Kaplan et al.

(10) Patent No.: US 7,615,508 B2
(45) Date of Patent: Nov. 10, 2009

(54) CATHODE FOR AIR ASSISTED BATTERY

(75) Inventors: Alexander Kaplan, Providence, RI (US); Thomas Kelly, Stamford, CT (US); Viet H. Vu, Middleton, WI (US)

(73) Assignee: The Gillette Company, Boston, MA (US)

( * ) Notice: Subject to any disclaimer, the term of this patent is extended or adjusted under 35 U.S.C. 154(b) by 25 days.

(21) Appl. No.: 11/800,934

(22) Filed: May 8, 2007

(65) Prior Publication Data

US 2007/0211571 A1     Sep. 13, 2007

Related U.S. Application Data

(63) Continuation of application No. 09/558,645, filed on Apr. 26, 2000, now Pat. No. 7,238,448.

(51) Int. Cl.
| | |
|---|---|
| *H01M 4/00* | (2006.01) |
| *H01M 4/62* | (2006.01) |
| *H01M 4/50* | (2006.01) |
| *H01M 4/88* | (2006.01) |
| *B01J 21/18* | (2006.01) |
| *B01J 27/06* | (2006.01) |
| *B01J 23/00* | (2006.01) |
| *B01J 23/02* | (2006.01) |
| *B01J 23/06* | (2006.01) |
| *B01J 23/40* | (2006.01) |
| *B01J 23/24* | (2006.01) |
| *B01J 23/74* | (2006.01) |

(52) U.S. Cl. ............ 502/101; 502/180; 502/181; 502/182; 502/183; 502/184; 502/185; 429/40; 429/41; 429/42; 429/43; 429/44; 429/217; 429/223; 429/224

(58) Field of Classification Search ............ 502/101, 502/180–185; 429/40–44, 27, 217, 223, 429/224
See application file for complete search history.

(56) References Cited

U.S. PATENT DOCUMENTS

| 2,597,116 A | 5/1952 | Marsal et al. |
| 2,641,623 A | 6/1953 | Winckler et al. |

(Continued)

FOREIGN PATENT DOCUMENTS

DE          3242139 A     5/1984

(Continued)

OTHER PUBLICATIONS

"A comparative study of carbons for use as an electrically conducting additive in the manganese dioxide cathode of an electrochemical cell," Weiming Lu et al. Composite Materials Research Laboratory, University at Buffalo, The State University of New York, Buffalo, NY 14260-4400, USA. Letters to the Editor/Carbon 40 (2002), pp. 447-449.*

(Continued)

*Primary Examiner*—Patricia L Hailey
(74) *Attorney, Agent, or Firm*—Fish & Richardson P.C.

(57) ABSTRACT

A cathode for an air recovery alkaline battery is disclosed. The cathode contains at least about 60% by weight $MnO_2$ and at least about 2% by weight of a hydrophobic polymer; the $MnO_2$ consists essentially of electrochemically synthesized $MnO_2$.

11 Claims, 11 Drawing Sheets

U.S. PATENT DOCUMENTS

| | | | |
|---|---|---|---|
| 3,297,484 A * | 1/1967 | Niedrach | 429/41 |
| 3,442,715 A * | 5/1969 | Deibert et al. | 502/4 |
| 3,698,956 A | 10/1972 | Masayuki et al. | |
| 3,837,921 A | 9/1974 | Henssen | |
| 3,869,314 A | 3/1975 | Gillespie | |
| 3,871,920 A | 3/1975 | Grebier et al. | |
| 3,902,922 A | 9/1975 | Kainiki-Kis | |
| 3,920,475 A | 11/1975 | Nabiullin et al. | |
| 3,928,072 A | 12/1975 | Gerbier et al. | |
| 3,945,847 A | 3/1976 | Kordesch et al. | |
| 3,948,684 A * | 4/1976 | Armstrong | 427/115 |
| 3,985,578 A * | 10/1976 | Witherspoon et al. | 429/44 |
| 4,032,696 A | 6/1977 | Urry | |
| 4,041,211 A | 8/1977 | Wiacek | |
| 4,105,830 A | 8/1978 | Kordesch | |
| 4,440,835 A * | 4/1984 | Vignaud | 429/42 |
| 4,507,438 A | 3/1985 | Obayashi et al. | |
| 4,541,871 A | 9/1985 | Obayashi et al. | |
| 4,568,442 A * | 2/1986 | Goldsmith | 204/284 |
| 4,582,553 A | 4/1986 | Buchta | |
| 4,590,227 A | 5/1986 | Nakamura et al. | |
| 4,877,694 A * | 10/1989 | Solomon et al. | 429/27 |
| 4,892,637 A * | 1/1990 | Sauer et al. | 204/291 |
| 4,935,317 A | 6/1990 | Fauteux et al. | |
| 5,079,106 A | 1/1992 | Urry | |
| 5,229,223 A | 7/1993 | Hyland | |
| 5,248,568 A | 9/1993 | Getz | |
| 5,270,128 A | 12/1993 | Reichert et al. | |
| 5,300,371 A | 4/1994 | Tomantschger et al. | |
| 5,308,711 A | 5/1994 | Passaniti et al. | |
| 5,328,778 A | 7/1994 | Woodruff et al. | |
| 5,401,590 A | 3/1995 | Chalilpoyil et al. | |
| 5,458,993 A | 10/1995 | Terao et al. | |
| 5,464,709 A | 11/1995 | Getz et al. | |
| 5,518,834 A | 5/1996 | Yoshizawa et al. | |
| 5,518,835 A | 5/1996 | Simmonds | |
| 5,587,259 A | 12/1996 | Dopp et al. | |
| 5,677,083 A | 10/1997 | Tomiyama | |
| 5,707,763 A | 1/1998 | Shimizu et al. | |
| D390,187 S | 2/1998 | Urvoy | |
| 5,800,939 A | 9/1998 | Mishina et al. | |
| 6,083,640 A | 7/2000 | Lee et al. | |
| 6,156,458 A | 12/2000 | Brodd et al. | |
| 6,174,622 B1 | 1/2001 | Thiebolt et al. | |
| 6,183,668 B1 | 2/2001 | Debe et al. | |
| 6,187,468 B1 * | 2/2001 | Shinkai et al. | 429/42 |
| 6,187,475 B1 | 2/2001 | Oh et al. | |
| 6,190,792 B1 * | 2/2001 | Faris et al. | 429/27 |
| 6,197,445 B1 | 3/2001 | Ward et al. | |
| 6,207,322 B1 | 3/2001 | Kelsey et al. | |
| 6,265,102 B1 | 7/2001 | Shrim et al. | |
| 6,265,104 B1 | 7/2001 | Hull et al. | |
| 6,270,921 B1 | 8/2001 | Kaplan et al. | |
| 6,280,879 B1 | 8/2001 | Anderson et al. | |
| 6,284,410 B1 | 9/2001 | Durkot et al. | |
| 6,296,969 B1 | 10/2001 | Yano et al. | |
| 6,316,142 B1 * | 11/2001 | Delnick et al. | 429/217 |
| 6,329,096 B2 | 12/2001 | Kawakami et al. | |
| 6,333,123 B1 | 12/2001 | Davis et al. | |
| 6,337,160 B1 | 1/2002 | Hilarius et al. | |
| 6,372,370 B1 | 4/2002 | Kaplan et al. | |
| 6,399,243 B1 | 6/2002 | Kaplan et al. | |
| 6,444,370 B2 * | 9/2002 | Barker et al. | 429/332 |
| 6,444,609 B1 * | 9/2002 | Golovin | 502/324 |
| 6,521,378 B2 | 2/2003 | Durkot et al. | |
| 6,780,347 B2 * | 8/2004 | Ndzebet | 252/500 |
| 7,018,568 B2 * | 3/2006 | Tierney | 252/511 |
| 7,238,448 B1 * | 7/2007 | Kaplan et al. | 429/224 |
| 7,282,467 B2 * | 10/2007 | Huisman et al. | 502/326 |
| 2003/0124422 A1 * | 7/2003 | Cintra et al. | 429/209 |
| 2003/0173548 A1 * | 9/2003 | Ndzebet et al. | 252/500 |
| 2003/0228522 A1 * | 12/2003 | Yang et al. | 429/306 |
| 2006/0110632 A1 * | 5/2006 | Hong et al. | 429/12 |
| 2007/0166602 A1 * | 7/2007 | Burchardt | 429/44 |
| 2008/0138696 A1 * | 6/2008 | Bartling | 429/42 |

FOREIGN PATENT DOCUMENTS

| | | |
|---|---|---|
| EP | 0 441 592 A2 | 8/1991 |
| EP | 0 540 324 A2 | 5/1993 |
| EP | 0 567 242 A1 | 10/1993 |
| EP | 0 964 467 A2 | 12/1999 |
| JP | 50-67431 A | 6/1975 |
| JP | 58-032370 * | 2/1983 |
| JP | 08031425 | 2/1996 |
| JP | 08162173 A | 6/1996 |
| JP | 08306398 A | 11/1996 |
| JP | 200082503 | 3/2000 |
| SU | 1048602 | 2/1979 |
| WO | WO 92/17910 | 10/1992 |
| WO | WO 00/36689 | 6/2000 |
| WO | WO 00/36693 | 6/2000 |
| WO | WO 00/54360 | 9/2000 |
| WO | WO 91/54210 | 7/2001 |
| WO | 01/82396 * | 11/2001 |

OTHER PUBLICATIONS

Treger, U.S. Appl. No. 09/280,367, filed Mar. 29, 1999.
Durkot et al., U.S. Appl. No. 09/115,867, filed Jul. 15, 1998.
Cegasa literature on Advanced Battery Technology, Aug. 1983.

* cited by examiner

CATHODE FOR AIR ASSISTED BATTERY

CROSS-REFERENCE TO RELATED APPLICATION

This application claims priority from U.S. Ser. No. 09/558,645, filed Apr. 26, 2000 now U.S. Pat. No. 7,238,448, which is incorporated herein by reference in its entirety.

BACKGROUND

This invention generally relates to air recovery batteries, and cathodes for these batteries.

Batteries are commonly used electrical energy sources. A battery contains a negative electrode, typically called an anode, and a positive electrode, typically called a cathode. The anode contains an active material that can be oxidized; the cathode contains an active material that can be reduced. The anode active material is capable of reducing the cathode active material. In order to prevent direct reaction of the anode material and the cathode material, the anode and the cathode are electrically isolated from each other by a separator.

When the battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

Air recovery batteries, also known as an air assisted or air restored batteries, are batteries in which the cathodes of the batteries are recharged by air. Air recovery batteries can have anodes including zinc powder, cathodes including manganese dioxide ($MnO_2$), and an aqueous solution of potassium hydroxide as the electrolyte.

At the anode, zinc is oxidized to zincate:

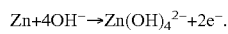

$Zn + 4OH^- \rightarrow Zn(OH)_4^{2-} + 2e^-$.

At the cathode, $MnO_2$ is reduced to manganese oxyhydrate:

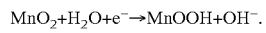

$MnO_2 + H_2O + e^- \rightarrow MnOOH + OH^-$.

When the cell is not in use or when the rate of discharge is sufficiently slow, atmospheric oxygen enters the cell and reacts with the cathode, thereby recharging the $MnO_2$ cathode:

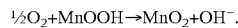

$\frac{1}{2}O_2 + MnOOH \rightarrow MnO_2 + OH^-$.

During high rates of discharge, air recovery batteries operate like conventional alkaline cell by reducing "fresh" (unreduced) $MnO_2$. During low rates of discharge and periods of rest with no current flow, the "consumed" (reduced) $MnO_2$ is restored or recharged by atmospheric oxygen to the fresh state.

The cathode must be wetted with the electrolyte for the reduction of $MnO_2$ to occur. However, the cathode of the battery should not be completely wetted by electrolyte because oxygen must reach the $MnO_2$ for recharging. If the cathode is completely wetted with electrolyte, air transport properties inside the cathode can be degraded, and the recharging of $MnO_2$ can slow down or stop completely.

SUMMARY

The invention features cathodes for use in air recovery batteries, and air recovery batteries made with these cathodes. The batteries are useful for both high and low power applications, and are especially useful for intermittent use applications.

In one aspect, the invention features a rechargeable cathode including a cathode paste that contains at least about 60% by weight $MnO_2$ and at least about 2% by weight of a hydrophobic polymer. The $MnO_2$ consists essentially of electrochemically synthesized $MnO_2$.

As used herein, a "rechargeable cathode" is one containing a catalyst that is capable of being reduced, then re-oxidized by oxygen from the atmosphere surrounding the cathode.

The cathodes of the invention maintain a balance between electronic conductivity, ionic conductivity, and gas diffusion properties. In addition, because the cathodes contain a relatively dense form of $MnO_2$, they can be relatively thin. Since the cathodes of the invention occupy less volume than, e.g., conventional alkaline battery cathodes, there is more room available for anode active material. In addition to being useful in air recovery batteries, the cathodes are useful in metal-air batteries.

In another aspect, the invention features an air recovery battery including: (a) a container having an air access port; (b) a cathode including a cathode paste containing at least about 60% by weight $MnO_2$, where the $MnO_2$ consists essentially of electrochemically synthesized $MnO_2$; (c) an anode comprising zinc; and (d) a separator between the cathode and the anode.

The air recovery batteries of the invention have longer service lives than corresponding alkaline batteries at low discharge rates. In addition, air recovery batteries have longer activated shelf lives than metal-air batteries and more power capability than metal-air batteries.

In another aspect, the invention features a method for making an air recovery battery. The method includes: (a) combining at least 60% by weight $MnO_2$, carbon, and a binder to form a cathode paste, where the $MnO_2$ consists essentially of electrochemically synthesized $MnO_2$; (b) spreading the cathode paste on a current collector to form a cathode; (c) inserting the cathode into a container having an air access port; (d) inserting anode material including zinc into the container; and (e) sealing the container.

In yet another aspect, the invention features a method for making a rechargeable cathode. The method includes: (a) combining a catalyst, carbon particles, and a solvent to form a mixture; (b) combining the mixture with a hydrophobic polymer at a temperature below about 10° C. to form a paste; (c) stirring the paste at a temperature below about 10° C.; and (d) warming the paste to at least about 20° C. and mixing the paste at this temperature.

This method ensures that all of the ingredients in the cathode paste are mixed uniformly. Uniform mixing in turn promotes good cathode performance.

Other features and advantages of the invention will be apparent from the description of the preferred embodiment thereof, and from the claims.

DETAILED DESCRIPTION

Figure 1:
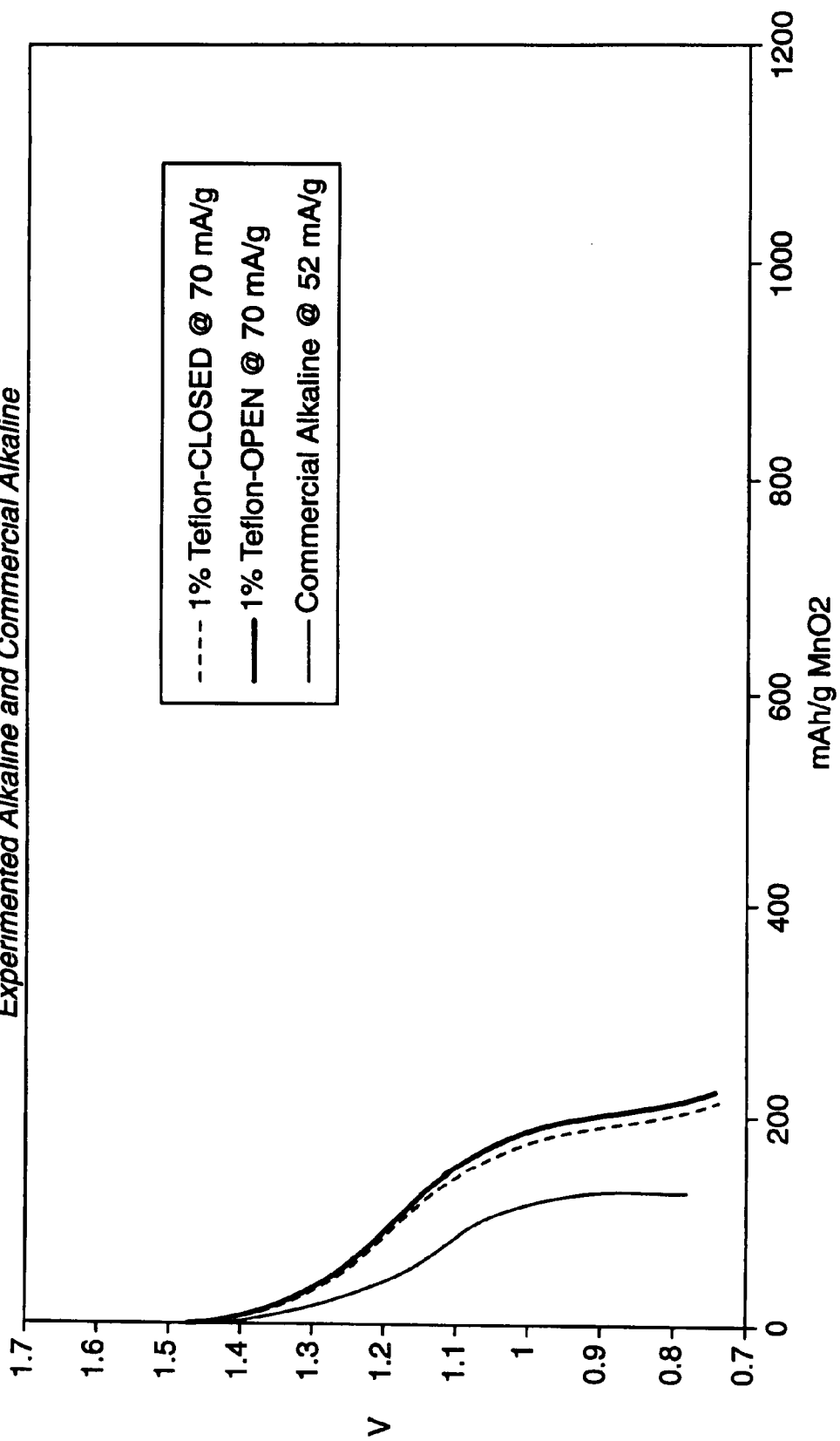
FIG. 1 is a graph showing voltage (V) vs. current (mA/g $MnO_2$) for open and closed cells made with cathode containing 1% by weight PTFE.

The cathodes of the invention can be used in air recovery batteries. Each of the batteries of the invention includes a container including at least one air access opening, a cathode, an anode, and a separator between the cathode and the anode. These batteries are useful for a variety of applications, and are especially useful in devices that are used for short periods of time, with rest periods in between use cycles.

The cathodes can be prepared by first forming a slurry or a dimensionally-stabilized dough of active material. Generally, a slurry is formed when the components are mixed at 0° C., while a dough is formed when the components are mixed at 20° C. If the current collector is a nickel foam collector, a slurry or dough can be used; if the current collector is an expanded metal ("Xmet") collector, a dough is preferred. The term "paste," used herein, refers to both the slurry and the dough.

To form the paste, $MnO_2$ and carbon can be combined in a V-blender. The powder mixture, along with a solvent, is then placed in a planetary blender. A binder is added, and the mixture is stirred 1-60 minutes, with or without refrigeration. The paste is then loaded onto a current collector as described below.

Alternatively, a premix can first be formed by combining a solvent, such as water, and carbon particles. During the preparation of the premix, the carbon particles are pre-wet, which ensures thorough mixing of the cathode paste. The premix is formed into a cake and allowed to dry. The dried cake is then pulverized to a fine powder. The powder is combined with additional solvent and water. Manganese dioxide is added, then additional solvent is added. In between each addition, the mixture is stirred at high speed. Next, a binder such as PTFE (e.g., Teflon®) is added, and the mixture is cooled to about 0° C. The low temperature ensures that the polymer is dispersed in the mixture without becoming fibrillated. The chilled mixture is stirred at low speed under vacuum. Additional PTFE is added, and the mixture is stirred again. Finally, the temperature is raised to about 20° C., and the mixture is stirred under vacuum. When the temperature is raised, fibrillation can occur to give the mixture adhesive/cohesive properties.

The final solids content of the paste can range from about 50 to about 80. If a slurry is used, the viscosity of the slurry preferably is between about 1500 and about 4000 centipoise.

Manganese dioxide reduces peroxide in the cathode, and thereby increases the running voltage. The $MnO_2$ in the cathode preferably consists essentially of electrochemically synthesized $MnO_2$ (EMD). Electrochemically synthesized manganese dioxide (EMD) is preferred because it is denser than other forms of $MnO_2$, such as chemically synthesized manganese dioxide (CMD). Because of the increased density, a relatively large amount of EMD can be included in each cathode. The cathode paste can contain 60-91% by weight of $MnO_2$, where the total weight of the cathode paste is calculated as the combined weight of the EMD, the binder, the carbon, and any other additives that are added before the paste is loaded onto the current collector. For example, the cathode paste can contain at least about 60%, at least about 70%, at least about 80%, at least about 85%, or at least about 90% by weight EMD. EMD can be purchased, e.g., from Kerr-McGee Chemical Corp. (Henderson, Nev.).

The paste also includes carbon black particles, which provide electrical conductivity. The carbon particles, which are high surface area carbon, are present in an amount effective to enable recharging of the $MnO_2$. The cathode paste can include about 1-15% by weight carbon particles. Examples of different types of carbon particles that can be used include Black Pearls 2000 (Cabot, Billerica, Mass.), Vulcan XC-72R (Cabot), Monarch 1300, Shawinigan Black (SAB) (Chevron, San Francisco, Calif.), Printex, Ketjenblack particles (Akzo Nobel, Chicago, Ill.), and PWA (Calgon Carbon, Pittsburgh, Pa.).

A binder is preferably present in an amount sufficient to produce wet-proofing (i.e., to limit flooding of the cathode by the electrolyte) without hindering the electrochemical reaction involving the discharge of $MnO_2$. The binder fibrillates and provides the cathode paste with adhesive/cohesive properties. The cathode paste preferably contains about 2-20% by weight of binder, and more preferably contains at least about 2%, 3%, 4%, 5%, 6%, or 7% by weight binder. The binder may be, for example, a hydrophobic polymer such as polytetrafluoroethylene (PTFE), polyethylene, or polypropylene.

The cathode paste may also include a solvent. An example of a suitable solvent is Isopar (available from Exxon Chemical Company, Houston, Tex.), water, alcohol (e.g., isopropyl alcohol), or a mixture of water and alcohol. Isopar can be used to form doughs; water and alcohol can be used to form slurries or doughs.

The cathode paste is loaded onto a current collector, which improves the conductivity and the physical strength of the cathode. When a dough is used, the current collector can be a grid, mesh, or screen made of expanded, electrically conducting metal or a combination of metals, such as nickel-plated steel (referred to as "Xmet"). The grid can help the cathode make better electrical contact with the battery container, as described below, and can help form the cathode into a desired shape. When a slurry is used, the current collector can be a nickel foam or Xmet, although foam is preferred.

In one embodiment, the paste prepared as described above can be extruded or injection molded into a cylindrical mold containing a current collector to form a tubular cathode. Alternatively, the paste can be extruded into a sheet, then calendared onto a metal grid. The cathode is dried, then calendared again. Individual cathodes can then be cut from the sheet and wound into the desired shapes. The cathode can be wound into a tube having a single layer, or one having multiple layers. All of the above-described methods produce cathodes in which the packing density of the active material on the current collector is substantially uniform throughout the cathode.

The desired thickness of the finished cathode will depend on the size and shape of the battery in which it is to be used. For example, in a AAA cell, the cathode is generally no more than about 0.4 mm thick; in a AA cell, the cathode is generally about 0.4-0.8 mm thick. The cathodes for C and D cylindrical cells are generally thicker than those for AAA and AA cells. These cathodes are thinner than standard alkaline cathodes, so relatively large amounts of anode material can be loaded into the cells. For button and prismatic cells, the cathodes can be about 0.4 mm to 0.7 mm thick.

For an air recovery electrode to be effective, the balance between electronic conductivity, ionic conductivity, and gas diffusion properties must be optimized. For example, a cathode that is too highly electrolyte repellent may be effective against electrolyte penetration and effective for gas transport properties, but it would also have poor ionic conductivity and poor $MnO_2$ discharge efficiency.

Moreover, while a cathode with inadequate electrolyte repellent may have good ionic conductivity, ionic concentration gradients may cause wetting or flooding and would be detrimental to gas diffusion properties and the recharge of $MnO_2$. A balance between conductivity and discharge efficiency can be achieved by selecting the proper relative amounts of binder, $MnO_2$, and carbon.

Referring to FIG. 1, the requirement of wet-proofing is shown. With only 1% PTFE in the cathode mixture, wet-proofing is inadequate. The discharge efficiency of cathodes made with 1% PTFE is not substantively different for opened and closed cells. The cathode is soaked with electrolyte and air cannot enter to recharge the $MnO_2$.

Figure 2:
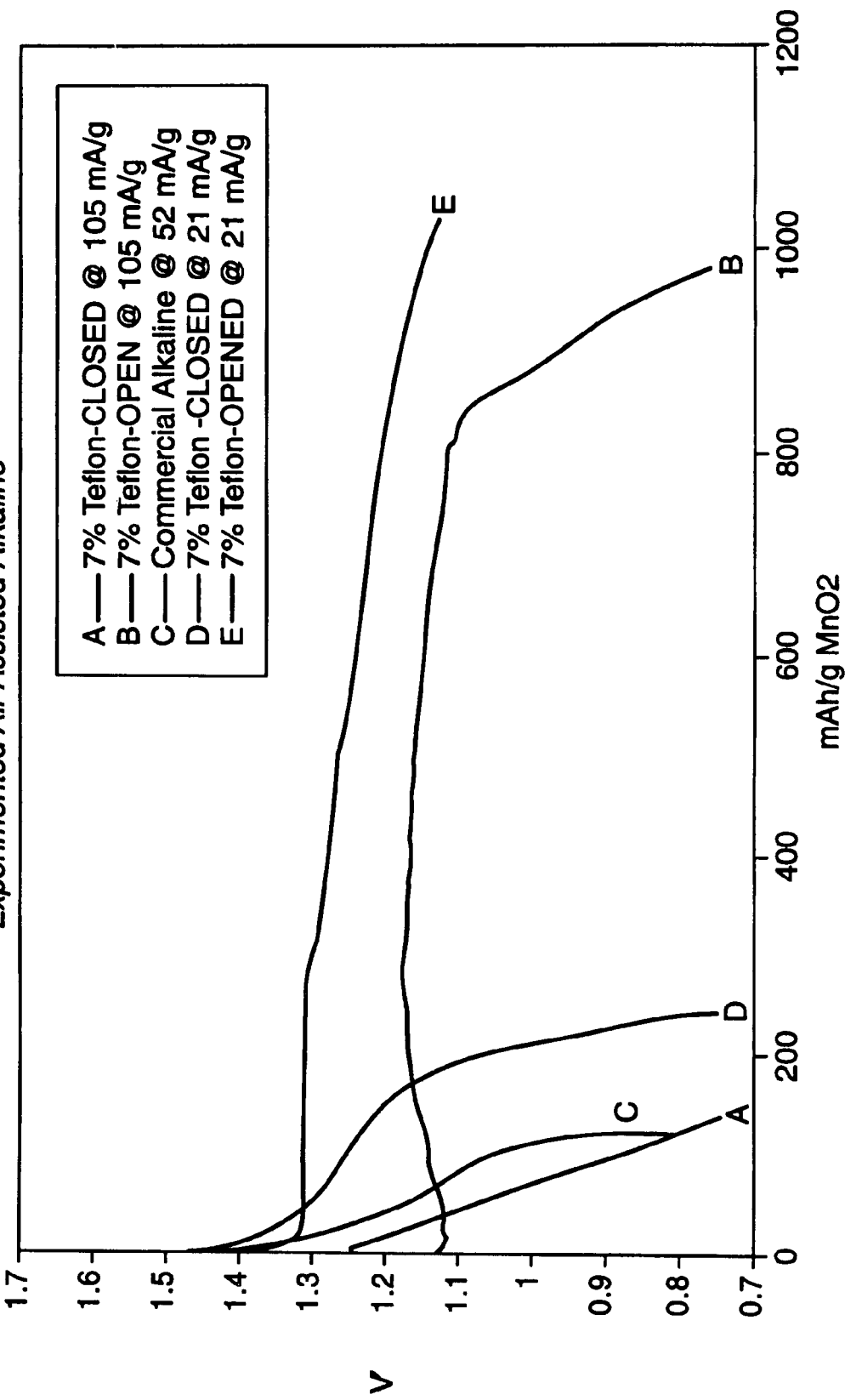
FIG. 2 is a graph showing voltage (V) vs. current (mA/g $MnO_2$) for open and closed cells made with cathode containing 7% by weight PTFE.

Referring to FIG. 2, when the amount of PTFE in the cathode is 7%, the cathode is effectively wet-proofed. The discharge efficiency of $MnO_2$ in the opened cell is more than seven times higher than that in the closed cell. This result demonstrates that air can enter the cell and recharge the $MnO_2$. Generally, amounts of PTFE between 2-20%, preferably between 2-7%, in the cathode 50 can provide effective electrolyte proofing.

The amount of time that the PTFE is mixed also has an impact on the finished electrodes. If the PTFE is mixed for too long, it will become over sheared. When the PTFE becomes over sheared, the paste sometime cannot be easily inserted into the current collector.

The battery of the invention also includes an anode. The anode can be formed of an anode gel, which contains a zinc material, a gelling agent, and an electrolyte. The anode is prepared by mixing the gelling agent and zinc powder to form a dry anode blend. The blend is dispensed into the anode can, and the electrolyte is then added to form the anode gel.

The zinc material can be alloyed with lead, indium, bismuth, tin, or aluminum, or a combination of these elements. For example, the zinc can be alloyed with between about 400 and 600 ppm (e.g., 500 ppm) of lead, between 100 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:
  0-3 wt % on 60 mesh screen;
  40-60 on 100 mesh screen;
  30-50 wt % on 200 mesh screen;
  0-3 wt % on 325 mesh screen; and
  0-0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate that helps prevent leakage of the electrolyte from the cell and helps suspend the particles of zinc within the anode material. The absorbent polyacrylate has an absorbency envelope of less than about 30 grams of saline per gram of gelling agent, measured as described in U.S. Pat. No. 4,541,871, incorporated herein by reference. The anode gel includes less than 3 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 45 percent, preferably between 35 and 42 percent of potassium hydroxide. The electrolyte can also include between about 1 and 2 percent of zinc oxide.

Air recovery batteries of various shapes and sizes can be made using cathodes of the invention. For example, prismatic cells, coin cells, cylindrical cells, and "racetrack" cells can be made.

Figure 3:
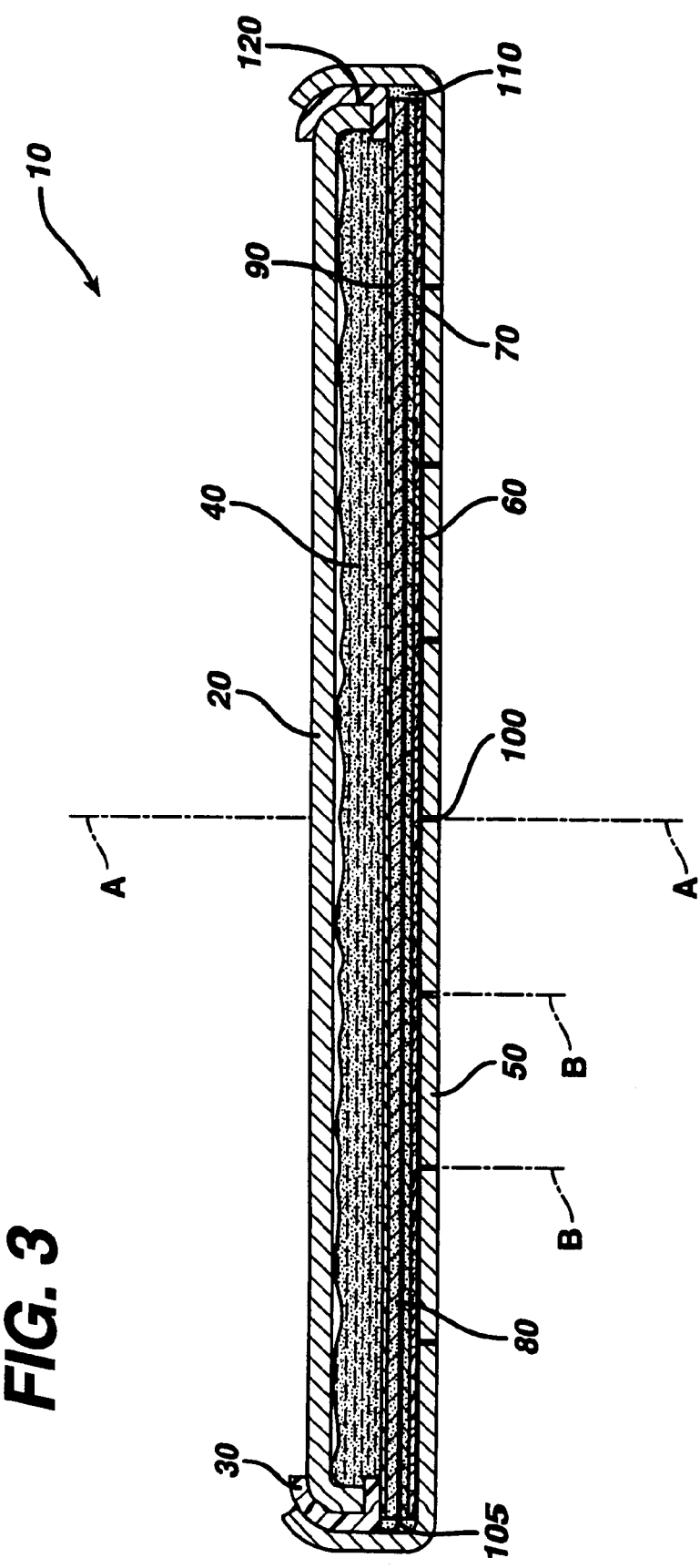
FIG. 3 is a cross-sectional view of a prismatic air recovery battery.
Figure 4:
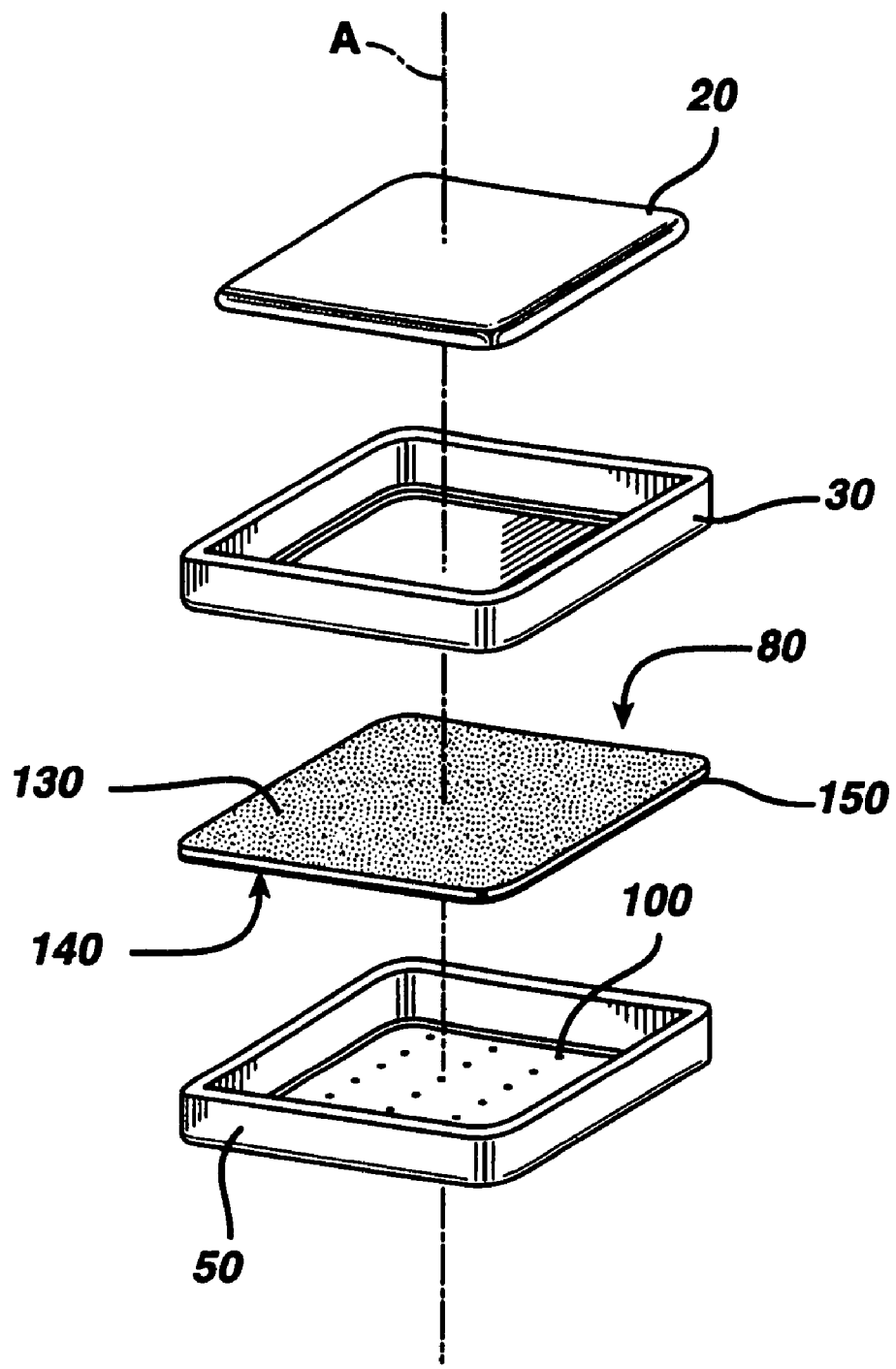
FIG. 4 is a simplified exploded view of a prismatic air recovery battery having a metallic cathode can and a metallic anode can.

Referring to FIGS. 3 and 4, a prismatic air recovery battery 10 includes a metallic anode can 20 and a metallic cathode can 50. Anode can 20 includes a seal 30 and an anode material 40. Cathode can 50 includes an air diffusion layer 60, a membrane 70, a cathode 80, a separator 90, and at least one air access opening 100. The anode can 20 and the cathode can 50 are sealed together, e.g., by applying a sealant 110 in the cathode can 50 and mechanically crimping the cathode can 50 over the seal 30.

Anode can 20 may include a tri-clad or bi-clad material, and is typically 0.2 to 0.5 mm thick. The bi-clad material can be stainless steel with an inner surface of copper. Preferably, the inner surface includes brass having approximately 70% copper and approximately 30% zinc. The tri-clad material can be composed of stainless steel having a nickel layer on he outer surface of the can and a copper or brass (70% Cu/30% Zn) layer on the inner surface of the can 20. Copper can be inexpensive and easy to apply, e.g., by flash deposition or hot deposition, but it can react with zinc in the anode material 40. Brass is preferred to restrict the anode can 20 from reacting with the anode material 40. The brass layer, generally about 60 microns thick, is typically hot pressed to form the bi-clad or tri-clad material. If the battery 10 is not to be subject to deep discharge, the anode can 20 may include tin on the inner surface. Tin does not react with the anode material 40 and has good initial gassing characteristics. The tin may be a continuous layer on the inner surface of the can. The tin layer may be a plated layer having a thickness between about 1 and 12 microns, preferably between about 2 to 7 microns, and more preferably about 4 microns. The tin may be pre-plated on a metal strip or post-plated on the anode can 20. For example, the tin can be deposited by immersion plating (e.g., using a plating solution available from Technics, Rhode Island). The plated layer can have a bright finish or a matte finish. The coating may also include silver or gold compounds.

The anode can 20 has a prismatic configuration with sides 120 that are substantially vertical, i.e., normal, to a bottom surface of the anode can 20. The sides 120 are also configured to mate with the seal 30 and the cathode can 50, as described below. The cell dimensions depend on the application or use for the cell. Typically, the anode can 20 is about 30 mm wide, 40 mm long, and 2.0 mm high, although other dimensions may be used.

The seal 30 is configured to fit securely around a periphery of the anode can 20 and to allow the cathode can 50 to be crimped over the seal 30, as described below. The seal 30 is typically made of nylon 0.5 mm thick.

Turning now to the cathode can 50, the cathode can 50 may be composed of cold-rolled steel having inner and outer layers of nickel, typically 3 to 5 microns thick. The steel is typically 0.25 to 0.5 mm thick. Typically, the cathode can 50 has a straight-walled, prismatic configuration, dimensioned to mate with the anode can 20 and the seal 30, such that the cathode can 50 can be sealed with the anode can 20, as will be described below. For example, the cathode can 50 may be 33 mm wide, 43 mm long, and 4 mm high.

The rechargeability of the cathode 80 is governed in part by the diffusion rate of atmospheric oxygen into the cathode 80 and the rate of chemical reaction between oxygen and MnO2. Openings 100 allow air to reach the cathode 80 so that the MnO2 cathode can be recharged. Maximizing the number of openings 100 in the cathode can 50 can optimize performance of the battery 10 but can also increase costs of manufacturing. Openings 100 generally have a diameter of 0.3 mm and are typically formed by laser drilling. For uniform performance, the openings 100 can be uniformly distributed on the cathode can 50. In some embodiments, the holes can be spaced 0.25 inch from the periphery of the cathode can 50 and 0.125 inch from other openings.

The air diffusion layer 60 is typically placed adjacent to the bottom of the cathode can 50. A sealant material, e.g., an asphalt sealant such as Asphalt B1128, available from BiWax Corp., is placed first in the cathode can 50 to secure the air diffusion layer 60 in place. During discharge of the battery 10, zinc (Zn) from the anode 40 can be oxidized to zinc oxide (ZnO), increasing the volume of the anode 40 and pushing the cathode 80 against the bottom of the cathode can 50. The air diffusion layer 60 helps to maintain an air diffusion space between the cathode 80 and the cathode can 50 by restricting the cathode 80 from obstructing or plugging up the air access opening(s) 100 in the can 50, thereby allowing the battery 10 to recharge. The air diffusion layer 60 is typically a porous or fibrous material 0.1 to 0.2 mm thick, such as filter material (e.g., Whatman (Clifton, N.J.) Grades 54, F490-08, and F490-02).

The membrane 70 is typically placed adjacent to the air diffusion layer 60. The membrane 70 is an air-permeable material such as polytetrafluoroethylene (PTFE). The membrane 70, typically about 0.1 mm thick, can be glued or laminated to the cathode can 50.

The cathode 80, which is contained within the cathode can, includes a catalyst paste mixture, as described above, and a current collector (not shown) in electrical contact with the cathode can. The cathode is typically adjacent to the membrane 70. The cathode 80 is typically planar, having major surfaces 130, 140 and sides 150. As used herein, a "major surface" is a surface having the largest area. The cathode 80 is placed in the cathode can 50 such that the major surfaces 130, 140 are normal to a central axis (A) of the battery 10. As used herein, a "central axis" is an axis running normal to a major surface. In some embodiments, the major surfaces 130, 140 of the cathode 80 are also normal to the central axes of the air access openings 100.

The separator 90, which is adjacent to the cathode 80, is used to electrically isolate the anode 40 from the cathode 80. The separator 90, typically 0.04 to 0.08 mm thick, is typically polyvinyl alcohol (PVA) coated on the cathode 80. The separator 90 can be coated on the cathode 80 in situ using an aqueous solution of 20% PVA having a defoamer and a fungicide to prevent organic growth. In situ coated separators are described, for example, in U.S. patent application Ser. No. 09/280,367, filed Mar. 29, 1999, hereby incorporated by reference. The separator 90 can also be a micro-porous polypropylene membrane (Celgard 5550, Hoechst-Celanese, (Summit, N.J.)), although the in situ coating typically provides a thinner separator with smaller Ohmic loss.

The battery 10 is assembled by sealing together the anode can 20 and the cathode can 50, with their respective contents placed inside. An asphalt sealant 110 (e.g., Asphalt B 1128, BiWax Corp.) is typically placed in the cathode can 50 to provide added protection against leakage of electrolyte. Typically, the cans 20, 50 are placed in an appropriately-sized die, and the rim of the cathode can 50 is mechanically crimped over the seal 30 and the anode can 20, sealing the battery 10. Crimping also compresses the seal 30 against the cathode 80 and the sealant 110, further providing protection from leakage of electrolyte.

Figure 5:
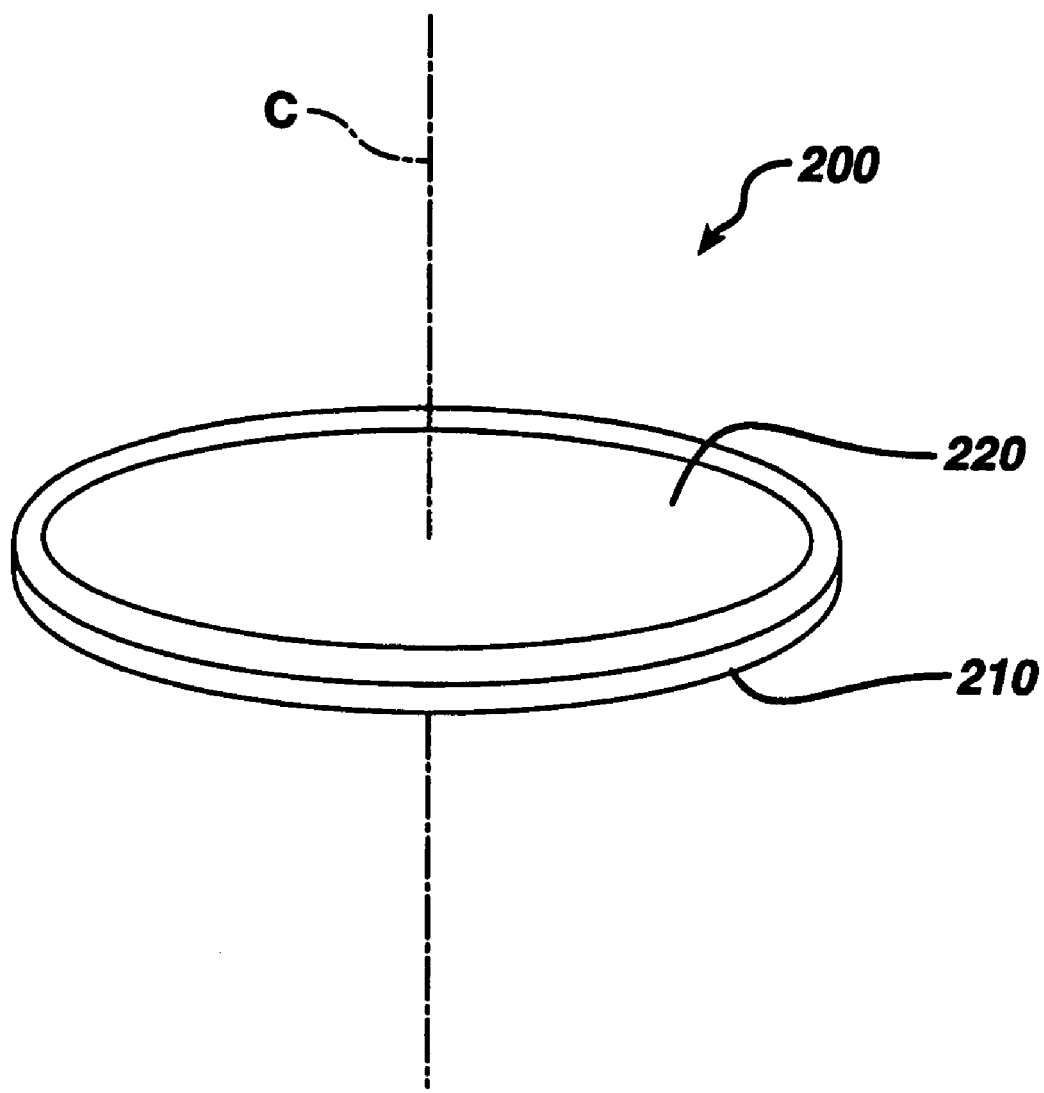
FIG. 5 is a perspective view of a coin battery.

In another embodiment of the invention, shown in FIG. 5, prismatic battery 200 has a coin cell configuration. Battery 200 comprises a circular cathode can 210 and a circular anode can 220 which, when assembled together, form battery 200 shaped as a circular prism having a central longitudinal axis (C). The specific dimensions of battery 200 are a function of the applications and uses for the battery. Battery 200 has the same cross-sectional structure as battery 10 shown in FIG. 1 and is assembled similarly to battery 10. The major surfaces of the cathode of battery 200 are normal to longitudinal axis C.

Figure 6:
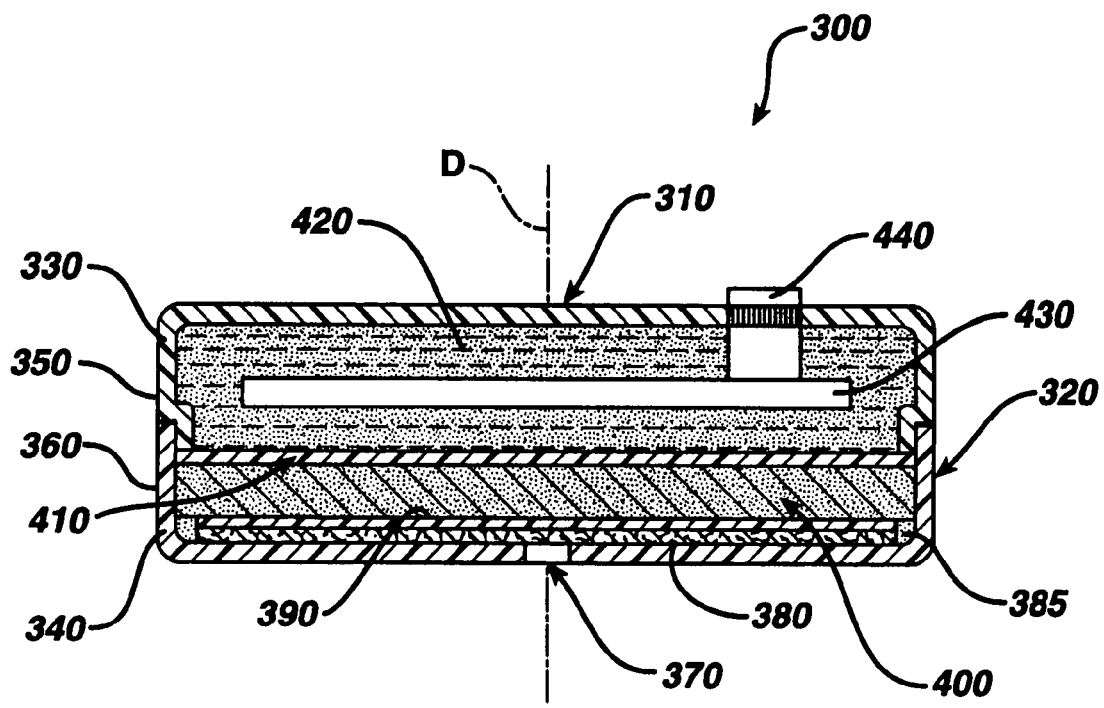
FIG. 6 is a cross-sectional view of a prismatic air recovery battery having a non-metallic cathode can and a non-metallic anode can.

In another embodiment of the invention, shown in FIG. 6, battery 300 comprises cans 310, 320 made of a non-metallic or non-conducting material, for example, plastic. The anode can 310 and cathode can 320 each have sides 330, 340, respectively. The sides 330, 340 have outer surfaces 350, 360, respectively. The anode can 310 and the cathode can 320 are sealed together such that the outer surfaces 350, 360 of their sides are flush. The battery 300 is sealed by ultrasonic sealing. Similar to batteries 10 and 200, assembled battery 300 has a prismatic configuration having a central longitudinal axis (D).

The internal structure of battery 300 remains substantially the same as battery 10. Cathode can 320 comprises at least one air access opening 370, each having a central longitudinal axis parallel with the central longitudinal axis (D) of the battery 300. Cathode can 320 includes an air diffusion layer 380 secured by sealant 385, a membrane 390, a cathode 400 disposed normal to central longitudinal axis D, and a separator 410. Anode can 310 includes anode material 420 and a current collector 430.

Since the cans 310, 320 are non-conducting, current contacts are formed in the cans 310, 320 in order for the battery to operate in a device. Typically, the anode can 310 comprises a hole (not shown) to receive a rivet 440. Rivet 440 is electrically connected to an anode current collector 430, for example, by welding. For uniform performance of the battery 300, the anode current collector 430 is generally shaped to extend uniformly throughout the inner cavity of the anode can 310, e.g., as a wire in a zigzag configuration or as a plate or a grid extending throughout the anode can 310.

Similarly, cathode can 320 also comprises a current contact (not shown). Depending on the application, the cathode current contact can be a rivet electrically connected, e.g., by welding, to the metal grid of the cathode 400. Alternatively, an electrically conducting tab can be welded to the cathode 400 and be extended out the battery 300.

Figure 7:
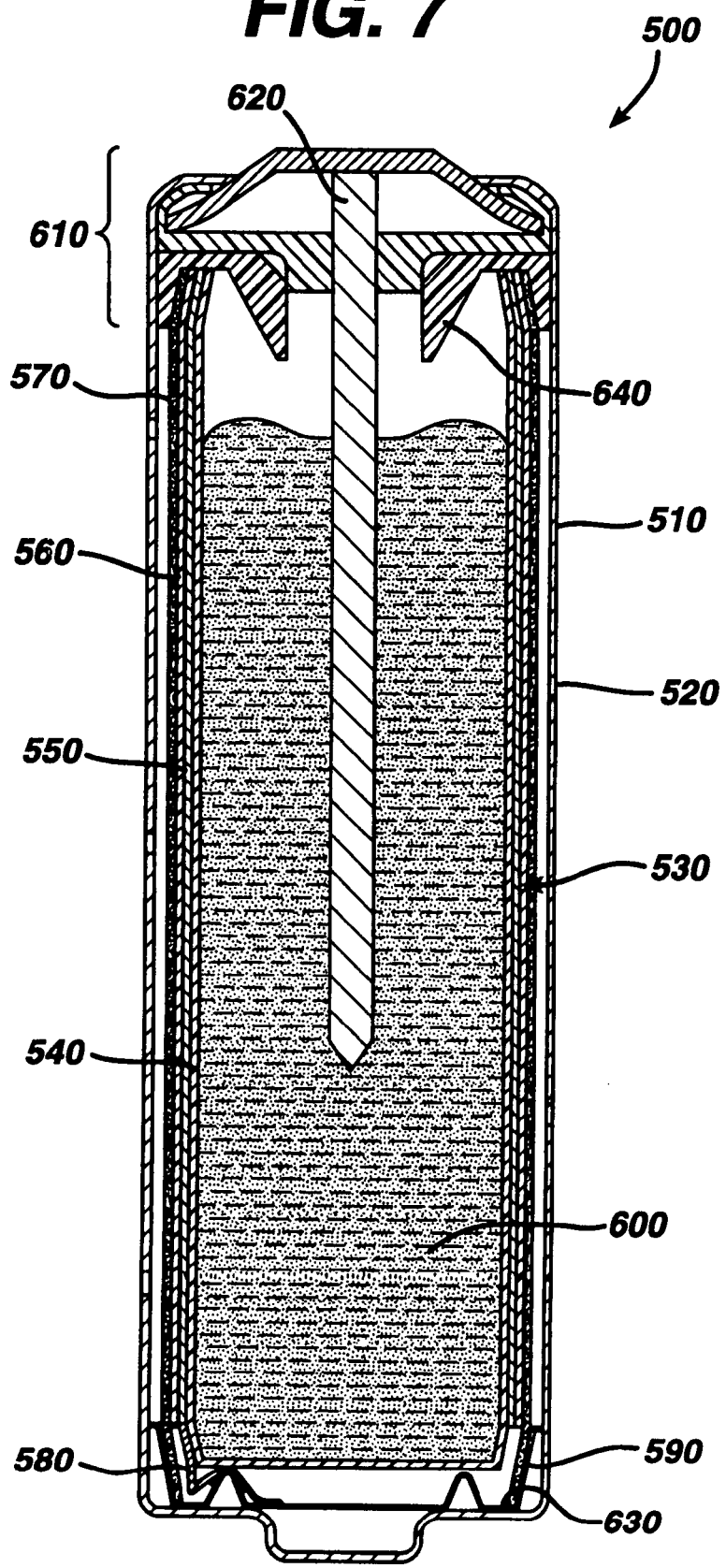
FIG. 7 is a cross-sectional view of a cylindrical air recovery battery.

The batteries of the invention can also be cylindrical cells. Referring to FIG. 7, a cylindrical air recovery battery 500 includes a can 510 having a wall with at least one air access opening 520 in the wall of the can 510. The can 510 includes a cathode assembly 530 formed to fit inside the can 510 to define a cavity. The cathode assembly 530 includes a separator 540, a cathode 550, a barrier layer 560, and an air diffusion layer 570. The cathode assembly 530 further includes a tab 580 welded to the cathode 550, and a bottom cup 590 placed on an end of the cathode assembly 530 and welded to the tab 580. Disposed inside the cavity of the cathode assembly 530 is an anode 600. Disposed on another end of the cathode assembly 530 is a sealing assembly 610 including a current collector 620. The can 510 is sealed, e.g., by a mechanical crimp, to form the battery 500. Generally, the method of assembling the battery 500 includes placing the cathode assembly 530 and the anode 600 into the can 510, and sealing the can 510 to form the battery 500.

The battery dimensions depend on the application or use for the cell. Overall dimensions of the can 510 are specified by the International Electrotechnical Commission (IEC). For examples, cylindrical AAAA, AAA, AA, C, or D cells can be prepared. The can is typically made of nickel-plated steel (Thomas Steel Co., Charlotte, N.C.).

Opening(s) 520 allows air to reach the cathode 550 so that the MnO2 cathode can be recharged. Maximizing the number of openings 520 in the can 510 can optimize performance of the battery 500 and product life, but can also increase costs of manufacturing. The opening(s) 520 can be placed in the wall of the can 510 and/or in the ends of the can 510. The opening (s) 520 placed in the wall of the can 510 may decrease the diffusion path for air entering the can 510, thereby improving the recharging efficiency of the battery 500. Openings 520 generally have a diameter of about 0.3 mm and are typically formed by laser drilling. For uniform performance, openings 520 are typically uniformly distributed on the can 510.

The cathode 550 is formed on a current collector (not shown) to improve the conductivity characteristics of the cathode 550. The current collector is a grid of expanded, electrically conducting metal or an alloy, such as nickel-plated steel. The grid can make forming the cathode 550 to a desired shape easier and can help the cathode 550 make better electrical contact with the tab 580 and the bottom cup 590, as described below.

The cathode 550 preferably is 0.4 to 1.4 mm thick, although specific dimensions of the cathode 550 are a function of the size of the battery 500 and application, e.g., depth of discharge. The cathode 550 is attached to the conductive tab 580, for example, by welding. The tab 580 provides better electrical contact between the cathode 550 and the bottom cup 590. The tab 580, about 0.1×3×15 mm, is typically a pure nickel flat stock. The cathode 550, with the tab 580 attached, is formed to fit inside the can 510. For example, if the battery is cylindrical, the cathode 550 can be wound on an appropriately-sized mandrel to form a cylindrical cathode assembly 530.

The cathode assembly 530 is wrapped with the barrier layer 560. As the battery 500 ages, electrolyte in the anode material 40 can travel through the cathode 550, for example, by wicking action through the cathode 550, and leak from the battery 500. The barrier layer 560, typically a 0.1 to 0.2 mm thick, air-permeable material such as PTFE, helps prevent the electrolyte from leaking out of the battery 500.

The barrier layer 560 is wrapped with the air diffusion layer 570. During discharge of the battery 500, zinc (Zn) from the anode 100 can be oxidized to zinc oxide (ZnO), increasing the volume of the anode 100 and pushing the cathode 550 against the side of the can 510. The air diffusion layer 570 helps to maintain an air diffusion space between the cathode 550 and the can 510 by restricting the cathode 550 from obstructing or plugging up the air access opening(s) 520 in the can 510, thereby allowing the battery 500 to recharge. The thickness of the air diffusion layer will depend on the size of the battery. For example, an air diffusion layer about 0.2 mm thick is optimal for a AA battery. If the air diffusion layer is thinner than 0.1 mm, it can be difficult for air to reach the cathode. If the air diffusion layer is thicker than 0.6 mm, too much volume is consumed by the air diffusion layer. The air diffusion layer 570 is typically a porous or fibrous material, such as filter material (e.g., Whatman (Clifton, N.J.) Grades 54, F490-08, and F490-02).

Alternatively, or in addition, to using the air diffusion layer 570, a groove can be formed in the can 510 to restrict the cathode 550 from obstructing the air access openings 520. The groove typically extends into the can 510 about 0.1 to 0.2 mm, approximately the thickness of the air diffusion layer 570. The groove can extend just around the center of the battery 500 since expanding anode material typically bulges the center of the cathode assembly 530 the most. In another embodiment, the battery 500 can include a plurality of grooves spaced along the height of the battery 500. The groove is typically formed after the battery 500 has been assembled so that the cathode assembly 530 can be inserted into the can 510. The can 510 is deformed by rolling the battery 500 around an indentation wheel.

To assemble the battery, the bottom cup 590 is placed on one end of the cathode assembly 530. The bottom cup 590 contains the cathode assembly 530, to minimize leakage of electrolyte and to provide better electrical contact between the cathode 550 and the can 510. The bottom cup 590 is fabricated to fit over an end of the cathode assembly 530 and into the can 510. For example, for a cylindrical battery 500, the bottom cup 590 may be shaped as a can having a bottom surface adapted to contact the can 510, as shown in FIG. 7. Additionally, the bottom cup 590 defines a groove 630 in which the cathode assembly 530 is placed. Prior to placing the bottom cup 590 on the cathode assembly 530, a sealant (not shown) is placed in the groove 630 as a barrier to restrict the electrolyte from leaking through the cathode assembly 530 and out of the battery 500. The sealant is typically an asphalt sealant such as Asphalt B1128, available from BiWax Corp. The bottom cup 590 is typically connected to the tab 580, for example, by welding. Welding secures the bottom cup to the cathode assembly 530 and provides better electrical contact between the can, the bottom cup, and the cathode.

The cathode assembly 530 is placed into the can 510 such that the cathode 550 electrically contacts the can 510. The cathode 550 electrically contacts the can 510 via the tab 580 and the bottom cup 590. If the tab 580 and the bottom cup 590 are not used, the cathode 550 can directly contact the can. In order for the cathode 550 to contact the can 510 directly, the cathode material is first cleared from the current collector. The current collector can then be welded to the can 510.

The separator 540 is placed in the cathode assembly 530. The separator 540 is used to contain the anode 600 and to electrically isolate the anode from the cathode 550 so as not to short circuit the battery 500 by direct reaction of the cathode 550 and the anode 600. The separator 540, generally 0.04 to 0.08 mm thick, is typically a porous, electrically insulating polymer, such as polypropylene (Celgard 5550, Celanese (Summit, N.J.)) or polyvinylacrylate (PVA), that allows the electrolyte in the anode material 100 to contact the cathode 550. As shown in FIG. 7, the separator 540 can be a tube having an open end and a closed end. The separator 540 is formed on an appropriately-sized mandrel so as to fit inside the cathode assembly 530.

The top cup 640 is placed on the open end of the cathode assembly 530. As shown in FIG. 7, the top cup, typically made of a non-conducting material such as nylon, is sized to fit over the open end of the separator 540 and the cathode assembly 530, and to mate with a seal. As with the bottom cup 590, the top cup 640 defines a groove. Prior to placing the cathode assembly in the top cup, an asphalt sealant (not shown) is placed in the groove to act as a barrier against electrolyte leakage.

Referring to FIGS. 8-11, an air recovery battery 700 includes a can 710 having a racetrack cross section. The can 710 includes cathode assembly 720 formed to fit inside the can 710 to define a cavity. The cathode assembly 720 includes a separator 730, a cathode 740, and a barrier layer 750. The cathode assembly 720 further includes a bottom cup 760 placed on one end. Disposed inside the cavity of the cathode assembly 720 is an anode 770. Disposed on another end of the cathode assembly 720 is a sealing assembly 780 including a current collector 790. The can 710 is sealed, e.g., by a mechanical crimp, to form the battery 700. Generally, the method of assembling the battery 700 includes placing the cathode assembly 720 and the anode 770 into the can 710, and sealing the can 710 to form the battery 700.

As used herein, "racetrack" means a battery that has a terminal face or a cross section between terminal faces the perimeter of which is elongated and has a pair of generally parallel edges. The perimeter could have, for example, two long parallel edges joined by two curved ends, or could be a generally oval shape (including, for example, a perimeter defined by a mathematical equation of an ellipse), or have a generally arcuate shape, for example, like a pea-pod.

The dimensions of the battery 700 depend on the application or use for the cell. For example, the battery 700 can have the approximate dimensions of multiple cylindrical batteries (e.g., AA, AAA) juxtaposed side-by-side. The battery 700 can also be dimensioned such that it can be stacked on other batteries. The can is typically made of nickel-plated steel (available from Thomas Steel Co., Charlotte, N.C.).

The cathode 740 is formed on a current collector (not shown) to improve the conductivity characteristics of the cathode 740. The current collector is a grid of expanded, electrically conducting metal or an alloy, such as nickel-plated steel. The grid can make forming the cathode 740 to a desired shape easier. In addition, the grid can be welded to the bottom cup 760 to provide better electrical contact between the cathode 740 and the can 710, as described below.

The cathode 740 is formed to fit inside the can 710 while maintaining an air plenum 90 between the cathode assembly 720 and the can 710. The air plenum 90 allows air to be distributed to the cathode 740. For example, the cathode 740 can be shaped on an appropriately-sized mandrel to form a racetrack cathode assembly 720.

The cathode assembly 720 is wrapped with the barrier layer 750. As the battery 700 ages, electrolyte in the anode 770 can travel through the cathode 740, for example, by wicking action through the cathode 740, and leak from the battery 700. The barrier layer 750, typically a 0.1 to 0.2 mm thick, air-permeable material such as PTFE, restricts the electrolyte from leaking out of the battery 700.

When the can 710 has air access openings formed in the wall of the can, the barrier layer 750 is wrapped with the air diffusion layer (not shown). During discharge of the battery 700, zinc (Zn) from the anode 770 can be oxidized to zinc oxide (ZnO), increasing the volume of the anode 770 and pushing the cathode 740 against the side of the can 710. The air diffusion layer helps to maintain an air diffusion space or plenum between the cathode 740 and the can 710 by restricting the cathode 740 from obstructing or plugging up the air access opening(s) in the can 710, thereby allowing the battery 700 to recharge. The air diffusion layer is typically a porous or fibrous material 0.1 to 0.2 mm thick, such as filter material (e.g., Whatman (Clifton, N.J.) Grades 54, F490-08, and F490-02).

Figure 8:
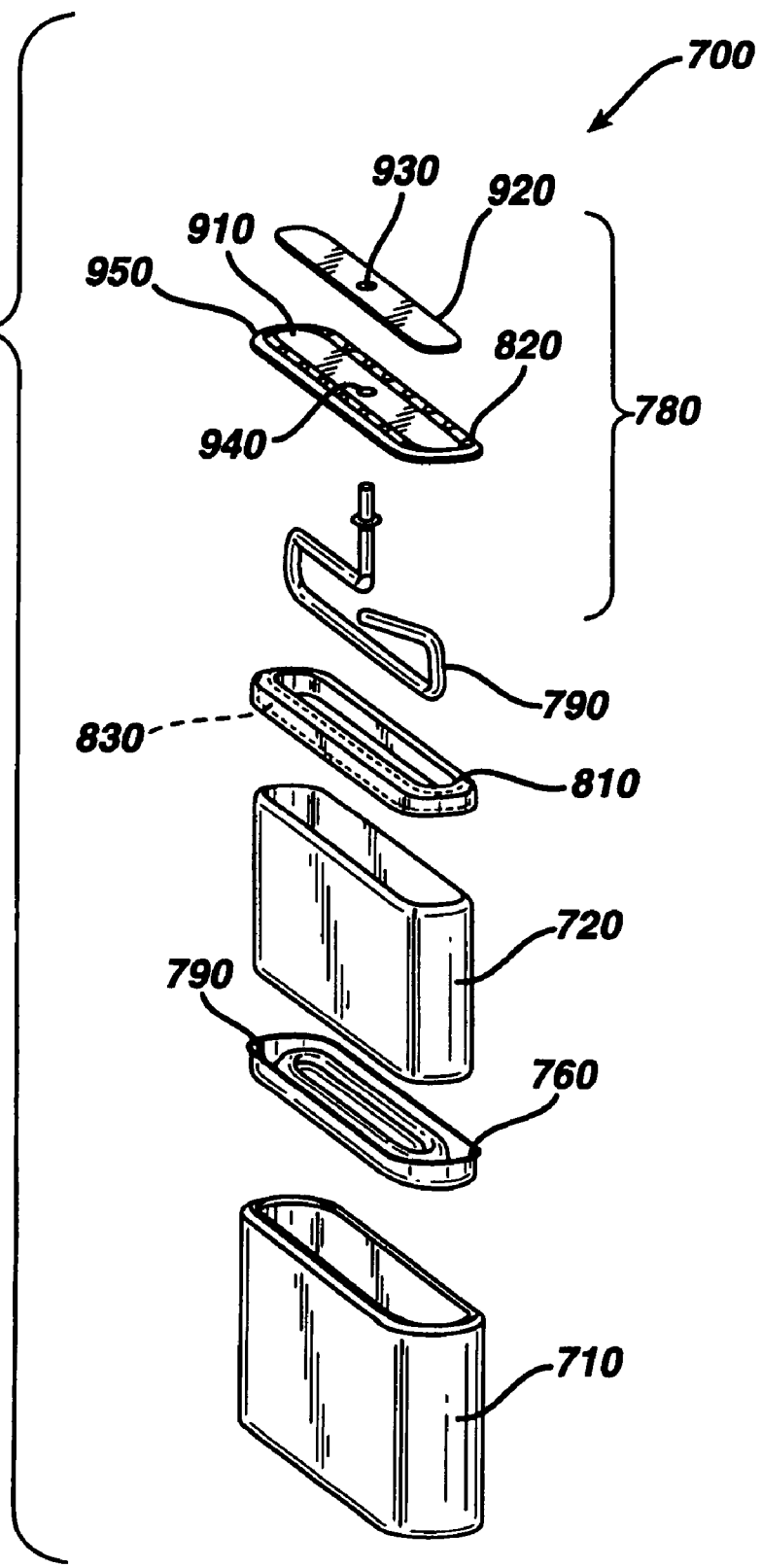
FIG. 8 is an exploded view of a racetrack air recovery battery of the invention.
Figure 9:
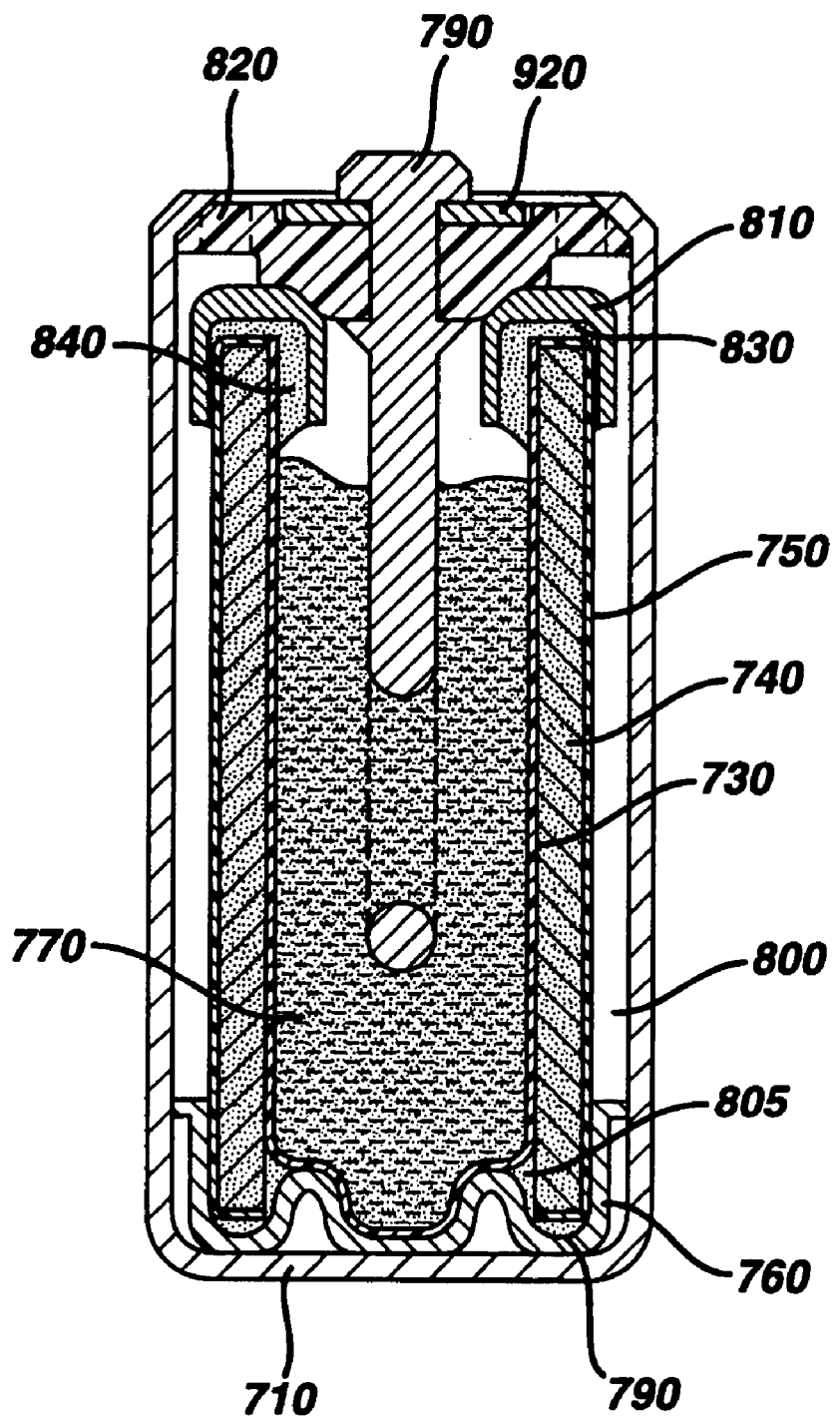
FIGS. 9 and 10 are cross-sectional views racetrack air recovery batteries of the invention.
Figure 10:
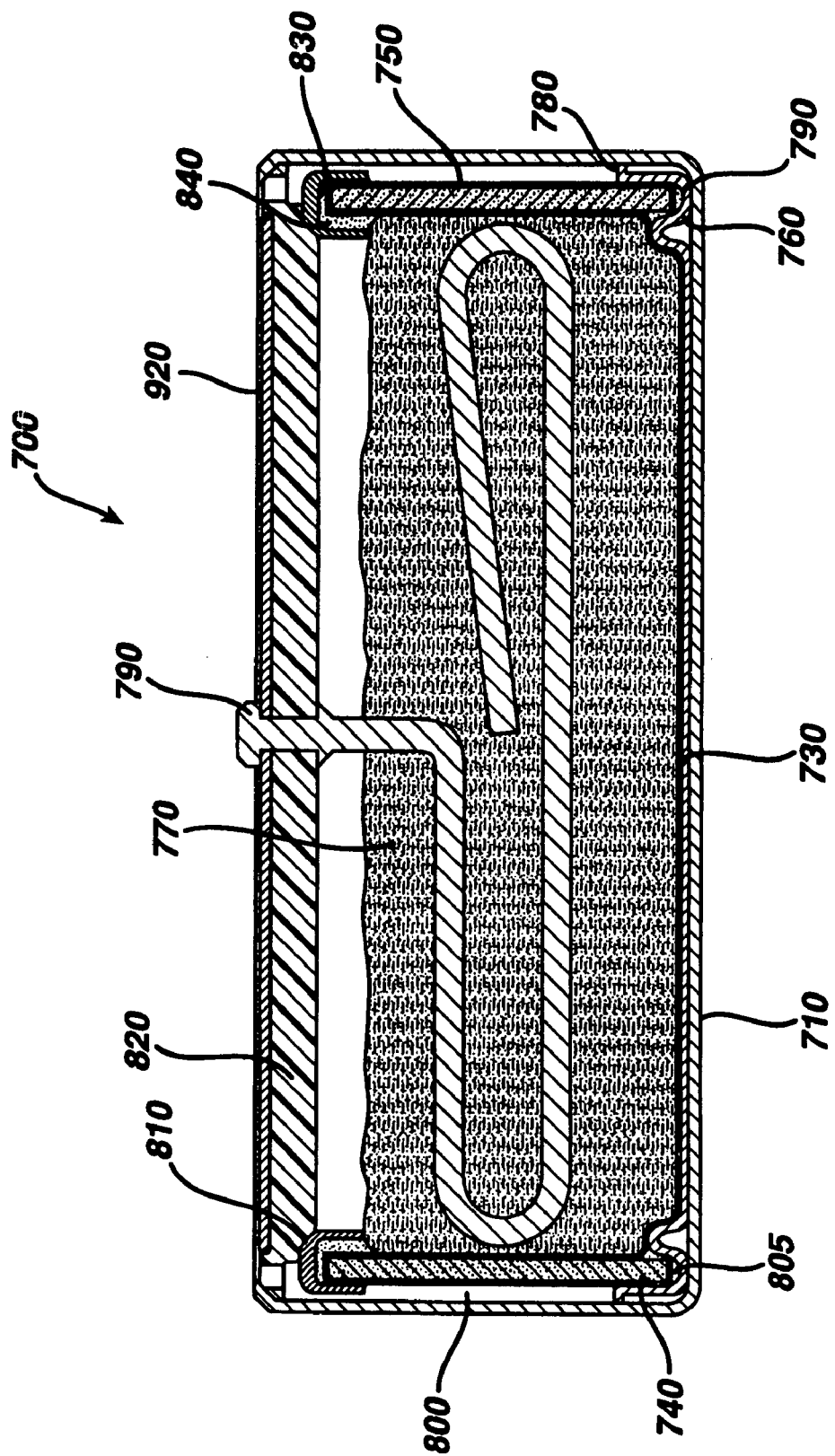
Figure 11:
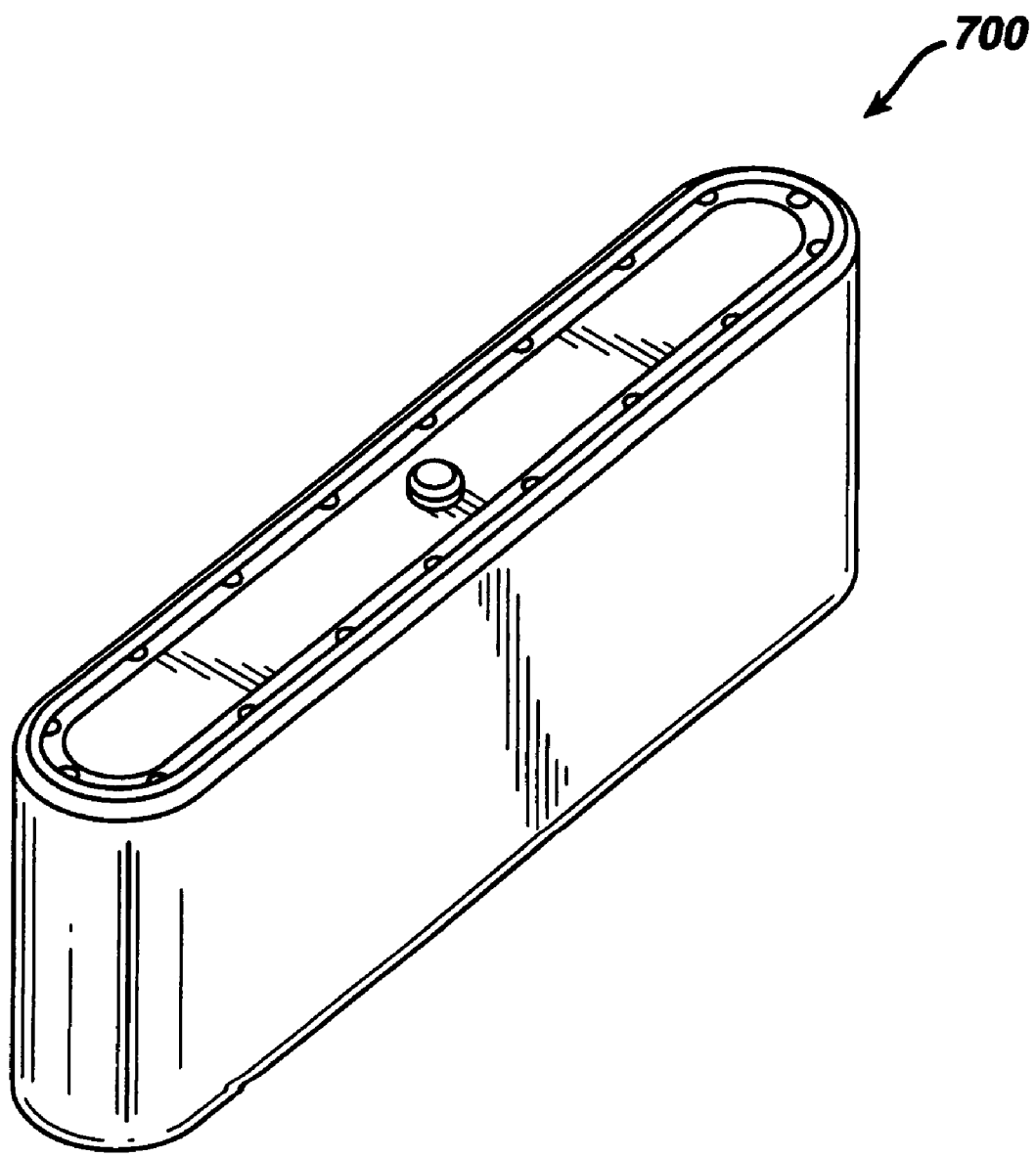
FIG. 11 is a perspective view of an assembled racetrack air recovery battery of the invention.

The bottom cup 760, typically made of steel, is placed on one end of the cathode assembly 720. The bottom cup 760 contains the cathode assembly 720, to minimize leakage of electrolyte and to provide better electrical contact between the cathode 740 and the can 710. The bottom cup 760 is fabricated to fit over an end of the cathode assembly 720 and into the can 710. The bottom cup 760 can be connected to the cathode assembly 720 by welding. Welding secures the bottom cup 760 to the cathode assembly 720 and provides better electrical contact between the can 710, the bottom cup 760 and the cathode 740. As shown in FIGS. 9 and 10, the bottom cup 760 has a rim 780 to help maintain the air plenum 800 between the cathode assembly 720 and the can 710. For example, for a racetrack battery 700, the bottom cup 760 may be shaped as a racetrack-shaped can having a rim and a bottom surface adapted to contact the can 710, as shown in FIG. 8. Additionally, the bottom cup 760 defines a groove 790 in which the cathode assembly 720 is placed. Prior to placing the bottom cup 760 on the cathode assembly 720, a sealant 805 is placed in the groove 790 as a barrier to restrict the electrolyte from leaking through the cathode assembly 720 and out of the battery 700. The sealant is typically an asphalt sealant such as Asphalt B1128, available from BiWax Corp.

The separator 730 is placed in the cathode assembly 720. The separator 730 is used to contain the anode 770 and to electrically isolate the anode 770 from the cathode 740 so as not to short circuit the battery 700 by direct reaction of the cathode 740 and the anode 770. The separator 730, generally 0.05 to 0.08 mm thick, is typically a porous, electrically insulating polymer, such as polypropylene (Celgard 5550, Celanese (Summit, N.J.)) or polyvinyl alcohol (PVA), which allows the electrolyte in the anode material 80 to contact the cathode 740. As shown in FIG. 8, the separator 730 can be a racetrack-shaped container having an open end and a closed end. The separator 730 is formed on an appropriately-sized mandrel so as to fit inside the cathode assembly 720. Alternatively, the separator 730 can be applied in situ.

A top cup 810 is placed on the open end of the cathode assembly 720. As shown in FIG. 8, the top cup 810, typically made of a non-conducting material such as nylon, is sized to fit over the open end of the separator 730 and the cathode assembly 720, and to mate with a seal 820, as described below. As with the bottom cup 760, the top cup 810 defines a groove 830. Prior to placing the cathode assembly 720 in the top cup 810, an asphalt sealant 840, shown in FIG. 9, is placed in the groove 830 to act as a barrier against electrolyte leakage. The cathode assembly 720 is placed into the can 710 such that the cathode 740 electrically contacts the can 710. The cathode 30 electrically contacts the can 710 via the bottom cup 760. If the bottom cup 760 is not used, the cathode can directly contact the can 710. In order for the cathode to contact the can 710 directly, the active material can first be cleared from the current collector. The current collector can then be welded to the can 710.

After the anode material has been placed in the can 710, a sealing assembly 780, including the seal 820, a current collector 790, and a support plate 920, is placed in the can 710. The sealing assembly 780 is provided to help prevent the anode material from leaking, to seal the battery 700, and to electronically connect the anode to an external circuit when the battery 700 is used in a device.

As shown in FIGS. 8 and 9, the seal 820 is fabricated to receive the current collector 790 and to mate with the top cup 810 such that the anode material 80 does not leak from the battery 700. The seal 820 is typically made of a non-conductive material such as nylon. The seal 820 has one hole 940 to receive the current collector 790. Although the seal 820 can have more than one hole to receive multiple current collectors, e.g., multiple nail-shaped collectors, having fewer holes minimizes the chance of anode material leaking from the battery 700. The seal 820 also has at least one air access opening 950. Typically, 6 to 18 openings 950 are uniformly distributed around the seal 820, adjacent the outer perimeter of the seal 820, to provide uniform discharge and consistent performance. Openings 950 are preferably 0.5-1 mm in diameter and are made during injection molding of the seal 820.

In addition or alternatively to using the air diffusion layer, a groove can be formed in the can 710 to restrict the cathode 740 from obstructing the air access openings 890. The groove typically extends into the can 710 about 0.1 to 0.2 mm, approximately the thickness of the air diffusion layer. The groove can extend just around the center of the battery 700 since expanding anode material typically bulges the center of the cathode assembly 720 the most. In another embodiment, the battery 700 can include a plurality of grooves spaced along the height of the battery 700. The groove is typically formed after the battery 700 has been assembled so that the cathode assembly 720 can be inserted into the can 710; the grooves are deformed by rolling the battery 700 around an indentation wheel.

The seal 820 also defines a recess 910 sized for containing the support plate 920. The support plate 920 is made of an electrical conductor, e.g., steel, dimensioned to fit in the recess 910 such that the battery 700 can be sealed by mechanically crimping the can 710 over the seal 820. The support plate 920 has an opening 930 to receive the current collector 790, which is riveted to the support plate 920 to provide electrical contact.

The anode current collector 790 is shaped to provide the battery 700 with uniform discharge. Since the length of a racetrack battery typically is larger than its thickness, i.e., it is anisotropic, the current collector 790 is shaped such that the distance between the current collector 790 and the reaction interface of the anode 770 is minimized and generally uniform throughout the battery 700. Non-uniform discharge can lead to inconsistent battery performance and less than optimum capacity of the battery. Accordingly, for effective current collection, the current collector 790 is shaped to extend substantially along a full length of the battery 700 to help the battery 700 discharge at uniform rates. For example, the current collector 790 can be a member such as a wire having at least two separate portions extending substantially along a full length of the battery 700, or it can be shaped similarly to a triangle. The current collector 790 is made of an electrically conducting material, such as brass or tin-plated brass wire, that is able to resist the corrosive effects of the anode material 80. The current collector 790 is also fabricated to mate with an opening in the seal 170.

The battery 700 is sealed by mechanically crimping the can 710 over the support plate 920. The assembled battery 700 is placed in an appropriately-sized die, and the rim of the can 710 is mechanically crimped over the support plate 920 and seal 820, sealing the battery 700. Additionally, to prevent the battery 700 from leaking during storage, e.g., due to expansion and contraction of the battery 700, sealing the can 710 may include providing along the crimp a sealant, e.g., asphalt sealant (BiWax Corp.). An assembled battery 700 is shown FIG. 11.

Cylindrical air recovery batteries are described in more detail in U.S. Ser. No. 09/487,355, filed Jan. 19, 2000, which is hereby incorporated by reference in its entirety; prismatic air recovery batteries are described in more detail in U.S. Ser. No. 09/488,217, filed Jan. 19, 2000, which is hereby incorporated by reference in its entirety; and racetrack air recovery batteries are described in more detail in U.S. Ser. No. 09/544,076, filed Apr. 6, 2000, which is hereby incorporated by reference in its entirety.

The invention is further described in the following examples, which do not limit the scope of the invention described in the claims.

EXAMPLE 1

A cathode for an air recovery battery was prepared as follows. 70 g SAB carbon (100% solids), 30 g graphite (100% solids), 200 g Pregel (2.5% solids), and 112 g deionized (DI) water were stirred at 65 rpm for 30 minutes. The Pregel contained sodium carboxymethylcellulose (CMC, available from Hercules) and sodium polyacrylate (SPA, available from 3V, Inc.) in a ratio of 3:2. The carbon mixture was combined with 860 g $MnO_2$ (100% solids) and 112 g DI water. The resulting mixture was stirred at 65 rpm for 30 minutes. Additional DI water (224.15 g) was added without discontinuing the mixing, and the mixture was stirred at 65 rpm for an additional 30 minutes.

PTFE (Teflon® T-30, 58.33 g, 60% solids) was added. The mixture was chilled to 2° C., and a vacuum was applied. The chilled mixture was stirred at 15 rpm for 30 minutes. It was then warmed to room temperature and mixed at 15 rpm for 5 minutes under vacuum. The density and percent solids of the slurry were checked; the slurry had a density of 1.76 g/cc and was 59% solids (broken down as follows: 86% $MnO_2$, 10% carbon and graphite combined, 3.5% Teflon®, and 0.50% Pregel).

The slurry was coated onto nickel foam and dried at 70° C. for 4 hours. The coated sheets were then calendared to the desired thickness.

EXAMPLE 2

A cathode slurry was prepared as described in Example 1. The cathode slurry contained 60% solids which were 86% EMD, 7% SAB carbon, 3% graphite, 3.5% T30 PTFE, and 0.5% CMC/SPA Pregel (the Pregel contained CMC and SPA in a ratio of 3:2). The cathode porosity was 45%; the loading onto the foam current collector was 15 g/dm², and the thickness was 0.8 mm.

The cathodes were formed into tubes. Three Teflon® rings were wrapped around each Teflon® ring was 4-5 mm wide. The Teflon® rings helped maintain a gap between the cathode and the can wall.

Fifteen AA cells were prepared using these cathodes. The anode contained 69% zinc. Electrolyte pre-shot (1.03 g) was used to prepare each cell. In each cell, the wall of the can had 10 0.3 mm holes. The cells were maintained for 72 hours in a closed condition. They were then tested using various use/rest discharge regimes (e.g., 2 minutes use, 28 minutes rest) at various currents. The open-circuit voltages ranged from 1.479 V to 1.552 V. The ohmic resistance of each cell was measured; the results are summarized below.

| Cell # | OCV | Ohmic R (mOhm) | Regime | I (mA) |
|---|---|---|---|---|
| 1 | 1.548 | 87 | 2/28 min | 300 |
| 2 | 1.552 | 64 | 2/28 min | 500 |
| 3 | 1.542 | 67 | 2 min/6 hr | 500 |
| 4 | 1.542 | 88 | 2/28 min | 200 |
| 5 | 1.547 | 68 | 2/58 min | 500 |
| 6 | 1.550 | 83 | 2/28 min | 300 |
| 7 | 1.547 | 74 | 2/28 min | 400 |
| 8 | 1.549 | 64 | 2/28 min | 500 |
| 9 | 1.551 | 58 | 2/28 min | 600 |
| 10 | 1.525 | 70 | 2/58 min | 500 |
| 11 | 1.525 | 63 | 2/28 min | 600 |
| 12 | 1.479 | 62 | 4 min/12 hr | 500 |
| 13 | 1.530 | 89 | 2/28 min | 200 |
| 14 | 1.542 | 77 | 2/28 min | 400 |
| 15 | 1.540 | 65 | 2 min/12 hr | 500 |

As shown in the table above, the ohmic resistance of the cells was low. Generally, the lower the ohmic resistance of a cell, the better cell performance is.

The table below summarizes the amp-hours and watt-hours obtained when the cells were tested using different currents and discharge regimes.

| Cell # | Test (I, regime) | A-hr @ 1.1 V | A-hr @ 1.0 V | A-hr @ 0.9 V | A-hr @ 0.8 V | W-hr @ 1.1 V | W-hr @ 1.0 V | W-hr @ 0.9 V | W-hr @ 0.8 V |
|---|---|---|---|---|---|---|---|---|---|
| 11 | 600 2/28 min | 0.20 | 1.18 | 2.18 | 2.69 | 0.24 | 1.24 | 2.20 | 2.64 |
| 9 | 600 2/28 min | 0.24 | 1.08 | 2.32 | 2.85 | 0.29 | 1.14 | 2.34 | 2.79 |
| 2 | 500 2/28 min | 0.36 | 2.16 | 2.89 | 3.26 | 0.42 | 2.32 | 3.02 | 3.34 |
| 8 | 500 2/28 min | 0.27 | 1.99 | 2.79 | 3.12 | 0.32 | 2.11 | 2.88 | 3.17 |
| 10 | 500 2/58 min | 0.13 | 1.76 | 2.65 | 3.04 | 0.15 | 1.85 | 2.70 | 3.04 |
| 5 | 500 2/58 min | 0.25 | 1.84 | 2.76 | 3.15 | 0.30 | 1.95 | 2.83 | 3.17 |
| 7 | 400 2/28 min | 0.70 | 2.68 | 3.13 | 3.33 | 0.82 | 2.94 | 3.37 | 3.55 |
| 14 | 400 2/28 min | 0.50 | 2.64 | 3.18 | 3.44 | 0.58 | 2.87 | 3.39 | 3.61 |
| 1 | 300 2/28 min | 2.19 | 3.32 | 3.68 | 3.85 | 2.52 | 3.73 | 4.08 | 4.23 |
| 6 | 300 2/28 min | 2.18 | 3.29 | 3.60 | 3.71 | 2.51 | 3.69 | 3.98 | 4.08 |

EXAMPLE 3

A premix was formed as follows: 87.2 g of isopropyl alcohol and 111.9 g deionized water were combined. 84 g SAB carbon was added, and the resulting mixture was stirred at 65 rpm for 15-30 minutes.

To form a cathode dough, 189.2 g of the premix powder were combined with 159.6 g isopropyl alcohol and 203.2 g of deionized water; the resulting mixture was stirred at 65 rpm for 15 minutes. 688 g $MnO_2$ were added, and the mixture was stirred at 65 rpm for 5 minutes. An additional 88 g isopropyl alcohol and 112 g of deionized water were added, and the resulting mixture was mixed at 65 rpm for an additional 15 minutes.

Next, 20 g of T-30 PTFE were added. The mixture was cooled to 2° C. and stirred at low speed 15 rpm and under vacuum for 5 minutes. An additional 20 g of PTFE was added, and the resulting mixture was stirred 15 seconds at 15 rpm under vacuum. The temperature was raised to 20° C. and stirred 1.5 minutes at 15 rpm, under vacuum.

The final cathode dough contained 54% by weight solids. Of these solids, 86% by weight were $MnO_2$; 7% by weight were carbon; and 7% by weight were PTFE. The dough was roll-coated onto Xmet.

EXAMPLE 4

A cathode dough was prepared as follows. $MnO_2$ (344 g, 100% solids) and SAB carbon powders (28 g, 100% solids) were mixed in a V-Blender with an intensifier bar for 10 minutes. The powders were mixed with 153 g DI water in a Planetary mixer at 65 rpm for 30 minutes at room temperature. PTFE (Teflon® T30, 47 g, 60% solids) was added to the wetted powder; the mixture was stirred at high speed for 1 minute under a vacuum of 27 inches Hg at room temperature. The dough contained 70% solids (broken down as follows: 86% $MnO_2$, 7% SAB carbon, and 7% PTFE).

To form the cathode, a pre-weighed amount of the dough was spread onto nickel-plated Xmet. The dough was calendared in small increments at a speed of 7 rpm on a calendaring mill. The dough was calendared to a thickness of 1.0-1.2 mm; care was taken to ensure that the dough was even distributed over the Xmet. The electrode was dried at 75° C. for 30 minutes. If necessary, the electrode was calendared again to achieve the desired thickness.

All publications and patents mentioned in this application are herein incorporated by reference to the same extent as if each individual publication or patent was specifically and individually indicated to be incorporated by reference.

From the foregoing description, it will be apparent that variations and modifications may be made to the invention described herein to adopt it to various usages and conditions. Such embodiments are also within the scope of the following claims.

What is claimed is:

1. A method of making a cathode for a rechargeable air assisted battery, the cathode comprising (1) a catalyst comprising manganese dioxide, (2) carbon particles, and (3) a hydrophobic polymer, the method comprising (a) combining the catalyst comprising manganese dioxide, the carbon particles, and a solvent to form a mixture that does not include the hydrophobic polymer;
(b) combining the mixture with the hydrophobic polymer and stirring the combination at a temperature below about 10°C. to provide a slurry without fibrillation of the hydrophobic polymer;
(c) warming the slurry to at least about 20°C. and mixing the slurry at this temperature to fibrillate the hydrophobic polymer;
(d) loading the slurry onto a cathode current collector; and
(e) drying the slurry by removing the solvent to provide the cathode, wherein the cathode comprises at least 70% of manganese dioxide by weight.

2. The method of claim 1, wherein step (b) comprises stirring the slurry under vacuum.

3. The method of claim 1, wherein step (b) comprises stirring the slurry at a speed of about 15 rpm.

4. The method of claim 1, wherein step (c) comprises stirring the slurry at a speed of about 15 rpm.

5. The method of claim 1, wherein the hydrophobic polymer is polytetrafluoroethylene.

6. The method of claim 1, wherein the cathode current collector comprises nickel.

7. The method of claim 1, wherein the cathode current collector comprises a nickel foam.

8. The method of claim 1, wherein the cathode comprises at least 85% by weight of manganese dioxide.

9. The method of claim 1, wherein step (b) comprises stirring the slurry at a temperature of about 0°C.

10. The method of claim 1, wherein the solvent is water.

11. The method of claim 1, wherein step (a) further comprises stirring the mixture at a speed of about 65 rpm.

* * * * *